United States Patent
Ackerman et al.

(10) Patent No.: US 12,163,907 B2
(45) Date of Patent: Dec. 10, 2024

(54) SYSTEM, METHOD AND APPARATUS FOR TESTING AND EVALUATING FLAME RESISTANCE

(71) Applicant: Valmont Industries, Inc., Omaha, NE (US)

(72) Inventors: Mark Ackerman, Sherwood Park (CA); Fouad Hilmy Fouad, Birmingham, AL (US); Aaron Schapper, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 505 days.

(21) Appl. No.: 17/530,655

(22) Filed: Nov. 19, 2021

(65) Prior Publication Data
US 2022/0170870 A1   Jun. 2, 2022

Related U.S. Application Data

(60) Provisional application No. 63/120,343, filed on Dec. 2, 2020.

(51) Int. Cl.
*G01N 25/50*   (2006.01)
*F23N 5/02*   (2006.01)

(52) U.S. Cl.
CPC ............... *G01N 25/50* (2013.01); *F23N 5/02* (2013.01); *F23N 2235/14* (2020.01)

(58) Field of Classification Search
CPC ........ F23N 5/02; F23N 2235/14; G01N 25/50

USPC ....................................... 431/18, 354; 374/8
See application file for complete search history.

(56) References Cited

U.S. PATENT DOCUMENTS

| | | | | |
|---|---|---|---|---|
| 2,379,155 | A * | 6/1945 | Huff | F24H 1/206 |
| | | | | 122/156 |
| 3,589,846 | A * | 6/1971 | Place | F23N 5/045 |
| | | | | 431/31 |
| 3,665,750 | A * | 5/1972 | Dawn | G01N 25/50 |
| | | | | 374/8 |
| 3,732,057 | A * | 5/1973 | Lipper | G05D 23/1919 |
| | | | | 431/31 |
| 4,176,162 | A * | 11/1979 | Stern | B01D 53/72 |
| | | | | 422/111 |
| 7,862,227 | B2 * | 1/2011 | West | G01N 25/22 |
| | | | | 374/45 |
| 2021/0100393 | A1 * | 4/2021 | Bentley | F23N 5/203 |

* cited by examiner

*Primary Examiner* — Avinash A Savani
(74) *Attorney, Agent, or Firm* — Milligan PC LLO (57) ABSTRACT

The present invention provides a testing apparatus which allows for the safe and cost-effective testing and evaluation of the heat and flame resistance of distribution pole specimens made of various types of materials such as concrete, steel and composites. According to a preferred embodiment, the present invention includes an enclosure having an outer wall with torch ports to allow attached torches to apply flame and heat to an enclosed specimen. According to a further preferred embodiment, the enclosure includes a raised specimen support pedestal which includes a specimen support surface for supporting the enclosed specimen at a desired height.

19 Claims, 15 Drawing Sheets

SYSTEM, METHOD AND APPARATUS FOR TESTING AND EVALUATING FLAME RESISTANCE

RELATED APPLICATIONS

The present application claims priority to U.S. Provisional Application No. 63/120,343 filed Dec. 2, 2020.

BACKGROUND AND FIELD OF THE PRESENT INVENTION

The present invention relates generally to an apparatus and method for the evaluation of the flame resistance of selected products. More specifically, the present invention relates to a system, method and apparatus for testing and evaluating the flame resistance of steel, concrete and fiberglass utility distribution pole samples.

BACKGROUND OF THE INVENTION

Traditional utility poles (also referred to as "distribution poles") are single, vertical columns or posts which are used to support overhead power lines and other public utilities. In this capacity, utility poles are inexpensive ways to keep electrical wires, cables and lights from touching the ground, and out of the way of people and vehicles.

Modern utility poles are generally formed of concrete, steel and/or composite (e.g., fiber reinforced polymer (FRP)) materials. These poles may be formed as hollow cylinders which can act as electrical chases for electrical wires and the like. The pole interior has increasingly been used by wireless and cable service companies to mount their equipment above the street surface.

An important limitation in using concrete, steel and composite poles is their susceptibility to fire damage such as when they are exposed to wild or brush fires. High temperatures around a utility pole can reduce the pole's structural strength and lifespan. Additionally, high temperatures can damage internal wires and cables. This can result in extensive time and expense to restore electrical power and other utilities in fire impacted areas. Often, the damage to the utility poles is the critical factor in protecting and restoring electrical power since the underground wiring and the suspended overhead lines are otherwise protected from ground fires.

To protect poles from fire, the most common solutions are adding fire-resistant additives to the pole materials and applying fireproof coatings to the outside of a fully formed pole. Regardless of the type of protection used, it is important to fully test pole designs for flame resistance. However, such flame resistance testing can be difficult and expensive to properly perform due to the prolonged high temperatures needed to test each pole. For example, the combustion product temperatures in a wild fire will usually be between 800° C. (1472° F.) and 1000° C. (1832° F.) but there have been reports in published literature of temperatures in excess of 1200° C. (2200° F.). Prolonged application of these types of temperatures are difficult to obtain and often result in unsafe conditions which degrade testing materials. Accordingly, there is presently a need for an apparatus which can safely and effectively test and evaluate the flame resistance of utility poles while simulating actual wildfire conditions that occur in the field.

SUMMARY OF THE PRESENT INVENTION

To address the shortcomings presented in the prior art, the present invention provides a testing system and method which allows for the safe and cost-effective testing and evaluation of the heat and flame resistance of concrete distribution pole samples of different types of materials.

According to a preferred embodiment, the present invention includes an enclosure having an outer wall with torch ports to allow attached torches to apply flame and heat to an enclosed specimen. According to a further preferred embodiment, the enclosure includes a raised specimen support pedestal which includes a specimen support surface for supporting the enclosed specimen at a desired height and cross-sectional size.

The present invention preferably further includes a fuel distribution system including a fuel source, fuel lines and solenoid valves which control the amount of fuel supplied to each torch.

The present invention preferably further includes a sensor system to detect temperature levels within the enclosure and within the specimen's wall and interior raceway, and a system controller which receives the temperature data from the sensor system and provides control signals to an ignitor and one or more solenoid valves to control heat and flame levels within the enclosure.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

DESCRIPTION OF THE PREFERRED EMBODIMENTS

For the purposes of promoting an understanding of the principles of the present invention reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to on skilled in the art.

Reference is now made in detail to the exemplary embodiments of the invention, examples of which are illustrated in the accompanying drawings. Wherever possible, the same reference numbers will be used throughout the drawings to refer to the same or like parts. The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to"), rather than the mandatory sense (i.e. meaning "must").

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

With reference now to FIGS. 1-15, the present invention teaches a system, method and apparatus for testing and evaluating the flame resistance of steel, concrete and composite (e.g., fiber reinforced polymer) utility distribution pole specimens. As should be understood, the examples discussed herein are intended to be illustrative and any of a variety of alternative systems, embodiments and/or configurations may be used with the present invention without limitation.

Figure 1:
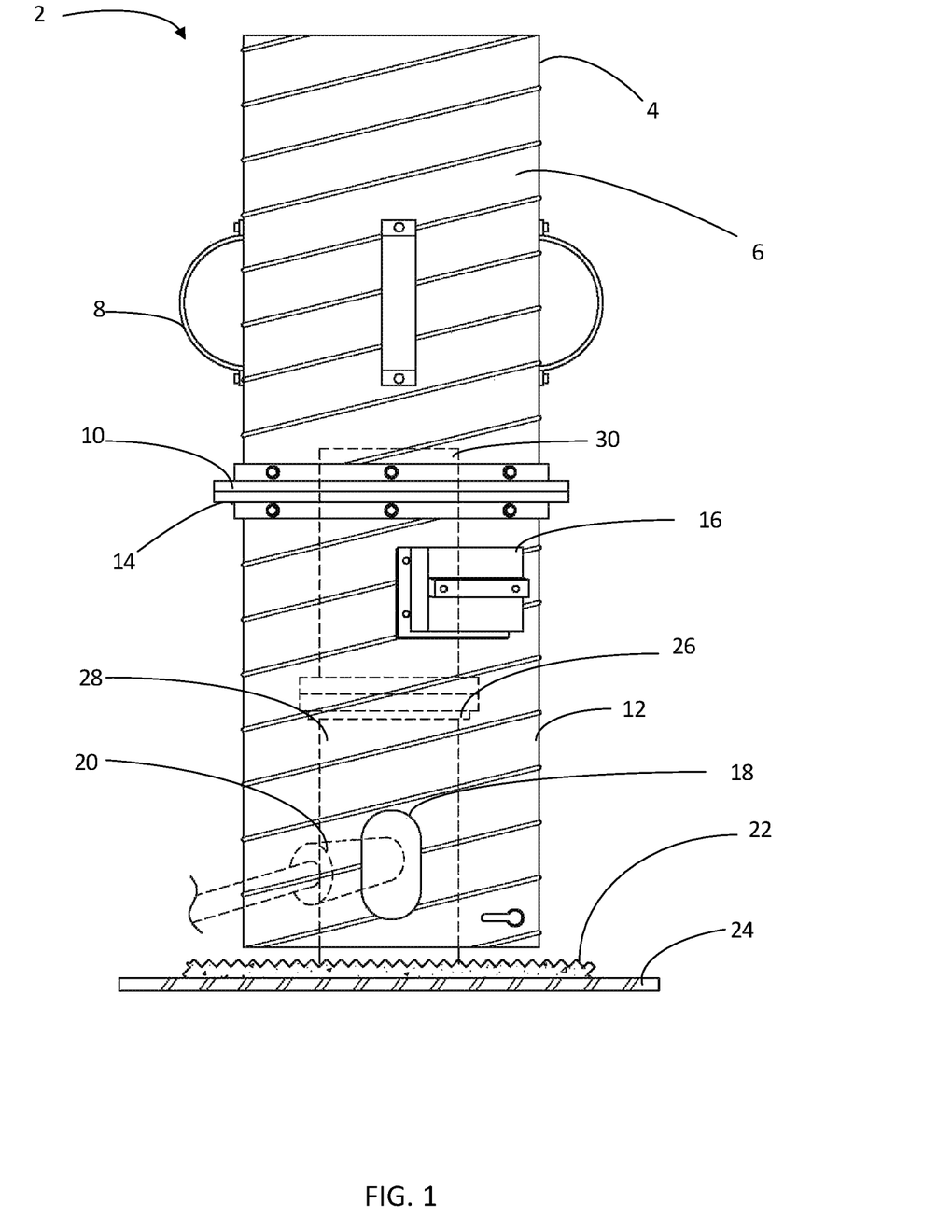
FIG. 1 is an elevation view of one embodiment of an exemplary pole testing apparatus in accordance with the present invention.
Figure 2:
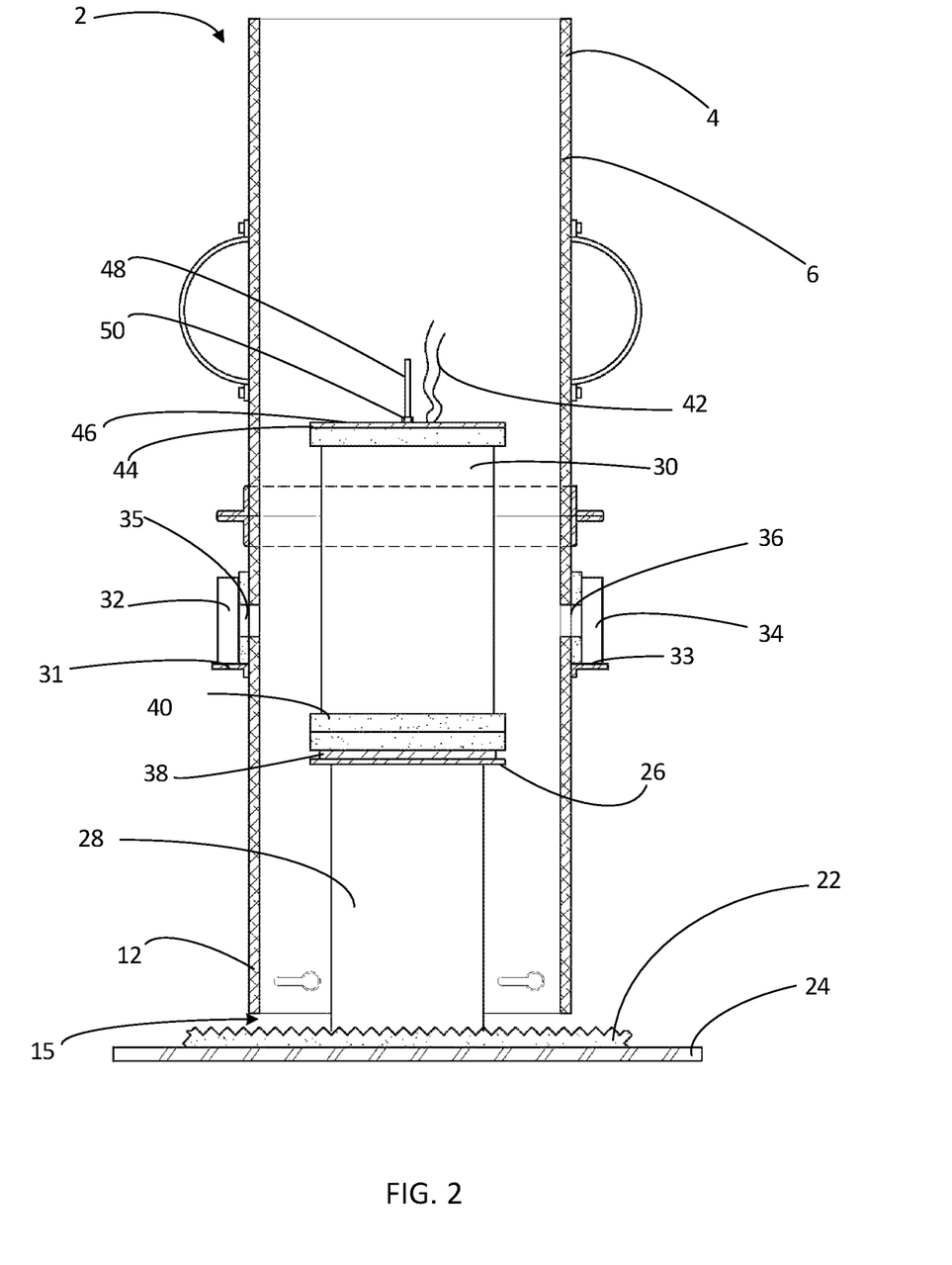
FIG. 2 is a second cross-sectional view of the embodiment shown in FIG. 1.
Figure 3:
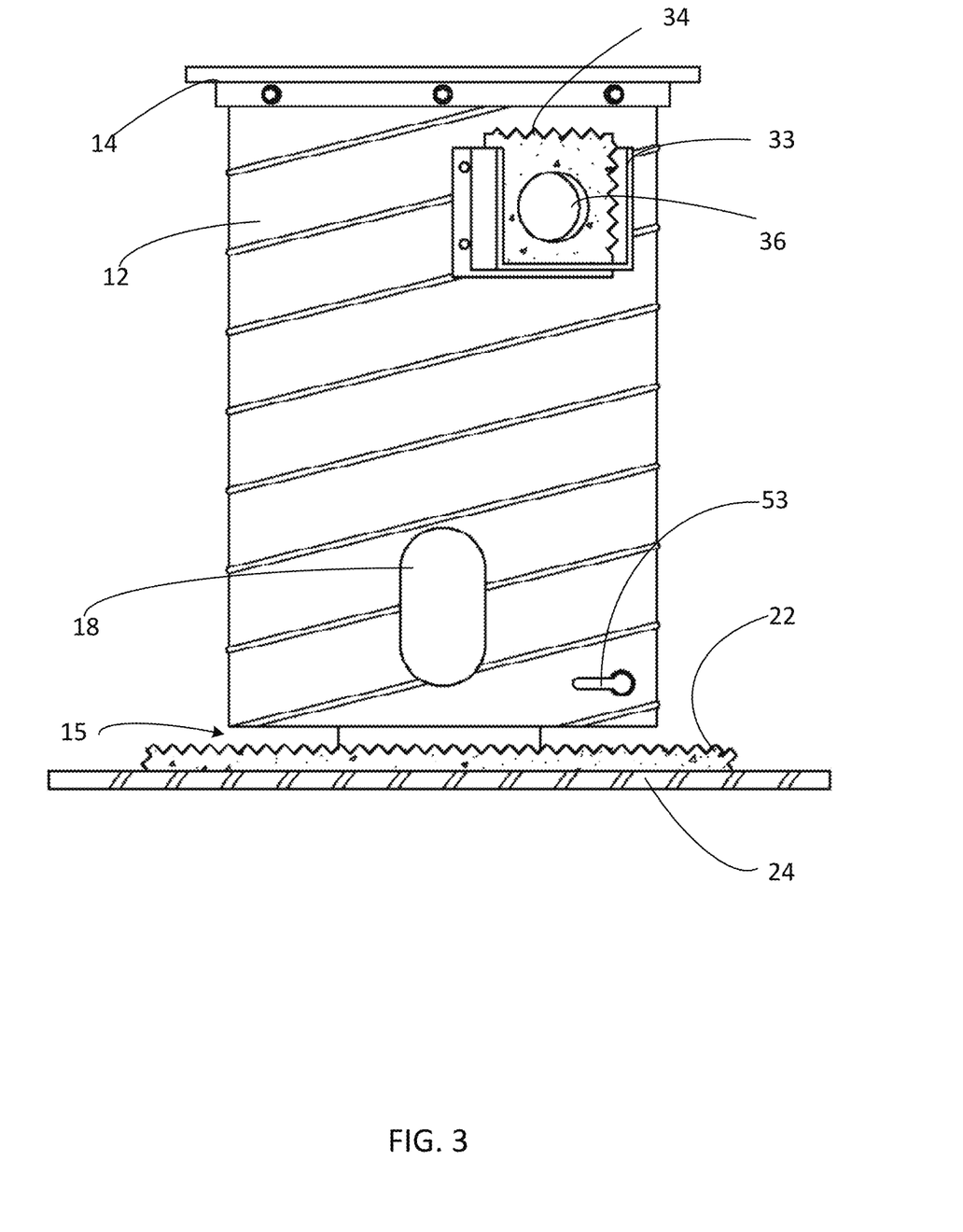
FIG. 3 is an elevation view of an exemplary lower enclosure in accordance with the present invention.

With reference now to FIGS. 1-3, an exemplary embodiment of the present invention shall now be discussed. As shown, the present invention provides a flame tester apparatus 2 which includes an enclosure 4 having torch ports 18 and torches 20 to apply flame and heat to an enclosed specimen 30. The enclosed specimen 30 is preferably positioned on a specimen support pedestal 28 or the like and is preferably surrounded with sensors 16 to detect flame and heat levels as discussed further below.

The enclosure 4 as shown and discussed herein is preferably formed of an upper enclosure 6 and a lower enclosure 12. According to preferred embodiments, the upper enclosure 6 may preferably be detachably connected to the lower enclosure 12 and include handles 8 for removal and attachment. As shown, the upper enclosure 6 may include an upper bolting flange 10, and the lower enclosure 12 may include a lower bolting flange 14. These flanges 10, 14 may preferably be secured together using one or more bolts inserted through each flange 10, 14.

Figure 4:
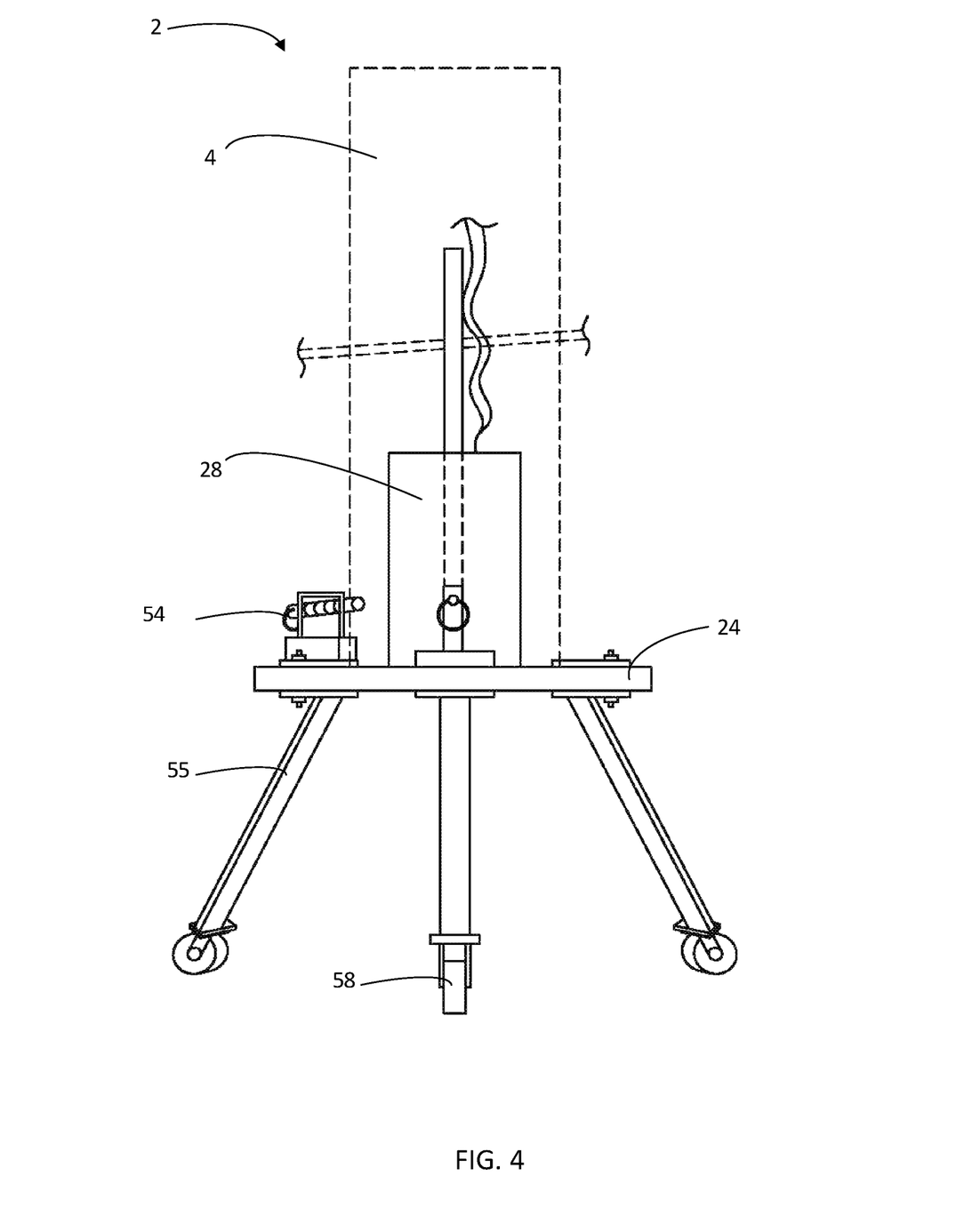
FIG. 4 is an elevation view of a second embodiment of an exemplary pole testing apparatus in accordance with the present invention.

According to a preferred embodiment, the enclosure 4 may be formed of material such as spiral sheet metal duct which may preferably be approximately 20 gauge. Alternatively, other heat resistant materials may also be used. As further shown, the lower enclosure 12 is preferably secured to a base plate 24. As discussed further below, the enclosure 4 may preferably sit on supports to maintain an air gap between the enclosure 4 and the base plate 24. The base plate 24 may preferably be insulated from the enclosure by an insulation mat 22 or the like. According to a preferred embodiment, the insulation mat 22 (and other insulation discussed herein) may preferably be formed of ceramic insulation. Alternatively, the insulation may be formed of any of a variety of insulating materials such as chopped fibers, foam, fibrous mats, textiles, board or block insulation, films and/or foils. As shown in FIG. 4, the base plate 24 of the present invention may preferably be secured to and supported by one or more legs 55 and casters 58 to allow the flame tester 2 of the present invention to be moved.

With particular reference now to FIG. 2, a cross-sectional view of the flame tester apparatus 2 is provided. As shown, the internal specimen 30 is preferably secured to a specimen support surface 26 which is attached to the specimen support pedestal 28. According to a preferred embodiment, the specimen 30 is preferably attached to a specimen carrier 38 and secured to the specimen support surface 26 as discussed with respect to FIGS. 6-10 below. The enclosure 4 preferably includes one or more sensor ports 35, 36 which allow for the sensors to access the interior of the enclosure. The enclosure preferably further includes sensor frames 31, 33 which support the attachment of mounted sensors 32, 34 as discussed further below.

Figure 5:
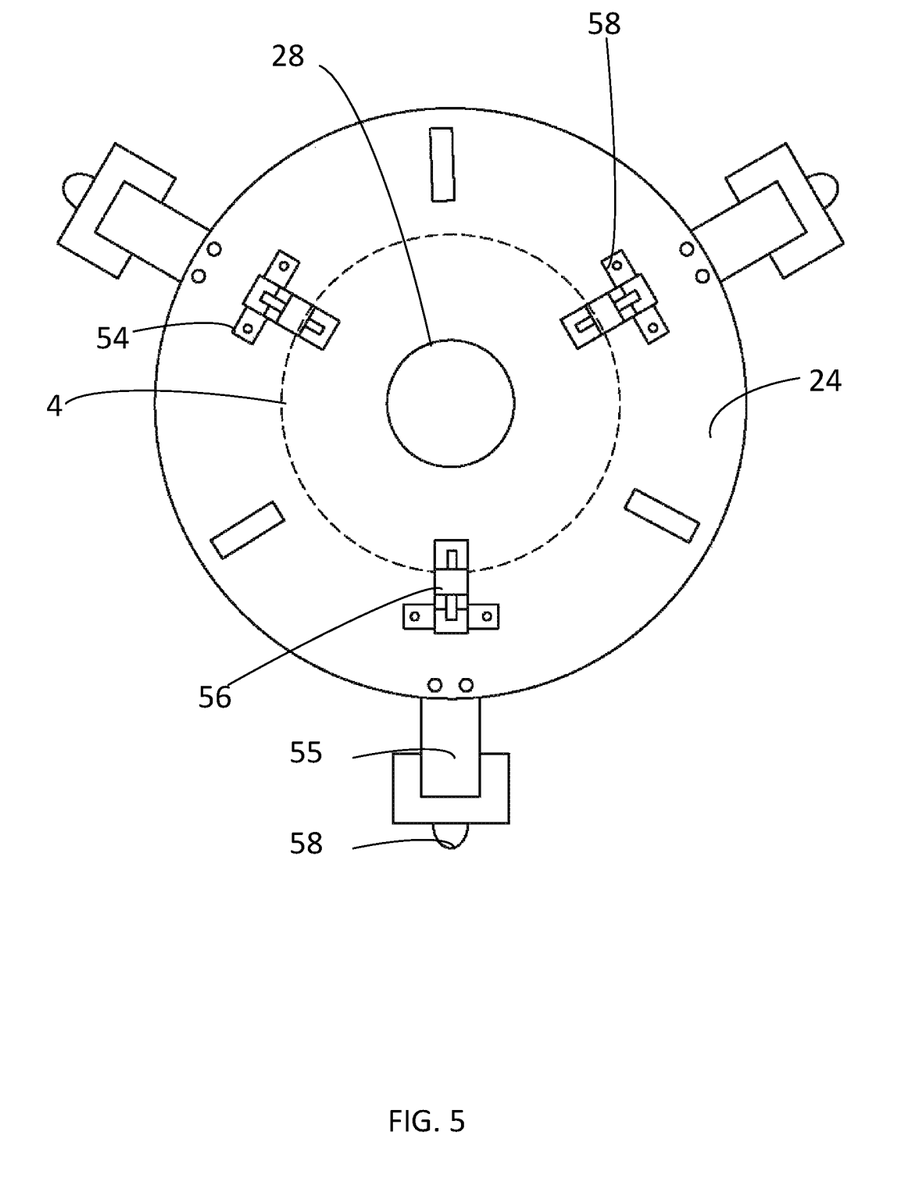
FIG. 5 is a simplified top-down view of the testing apparatus shown in FIG. 4.
Figure 6:
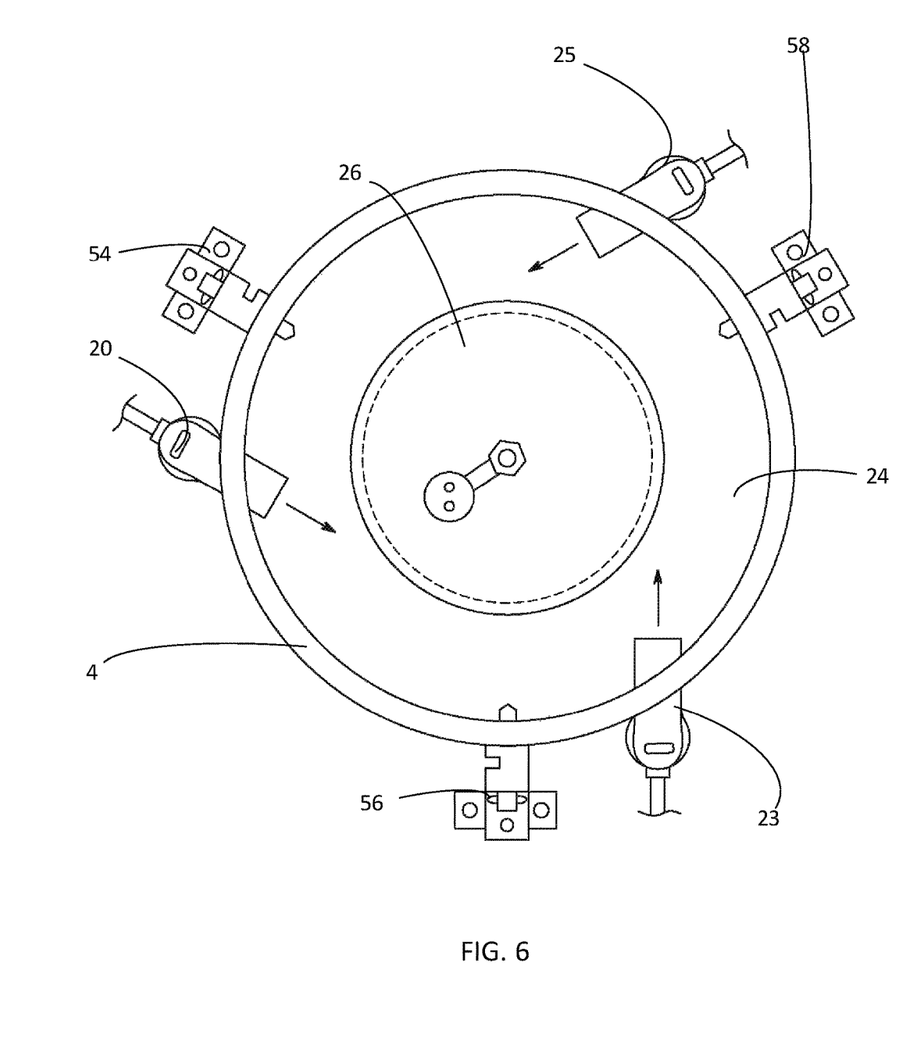
FIG. 6 is a further top down view of the testing apparatus shown in FIG. 4.

As shown in FIGS. 4-6, the enclosure 4 may preferably be attached to the base plate 24 using one or more spring locks 54, 56, 58 which are inserted into one or more keyhole openings 53 (shown in FIG. 3 and as discussed further below). FIG. 6 provides a top-down view of a flame tester 2 as discussed with respect to FIGS. 1-4.

Figure 7:
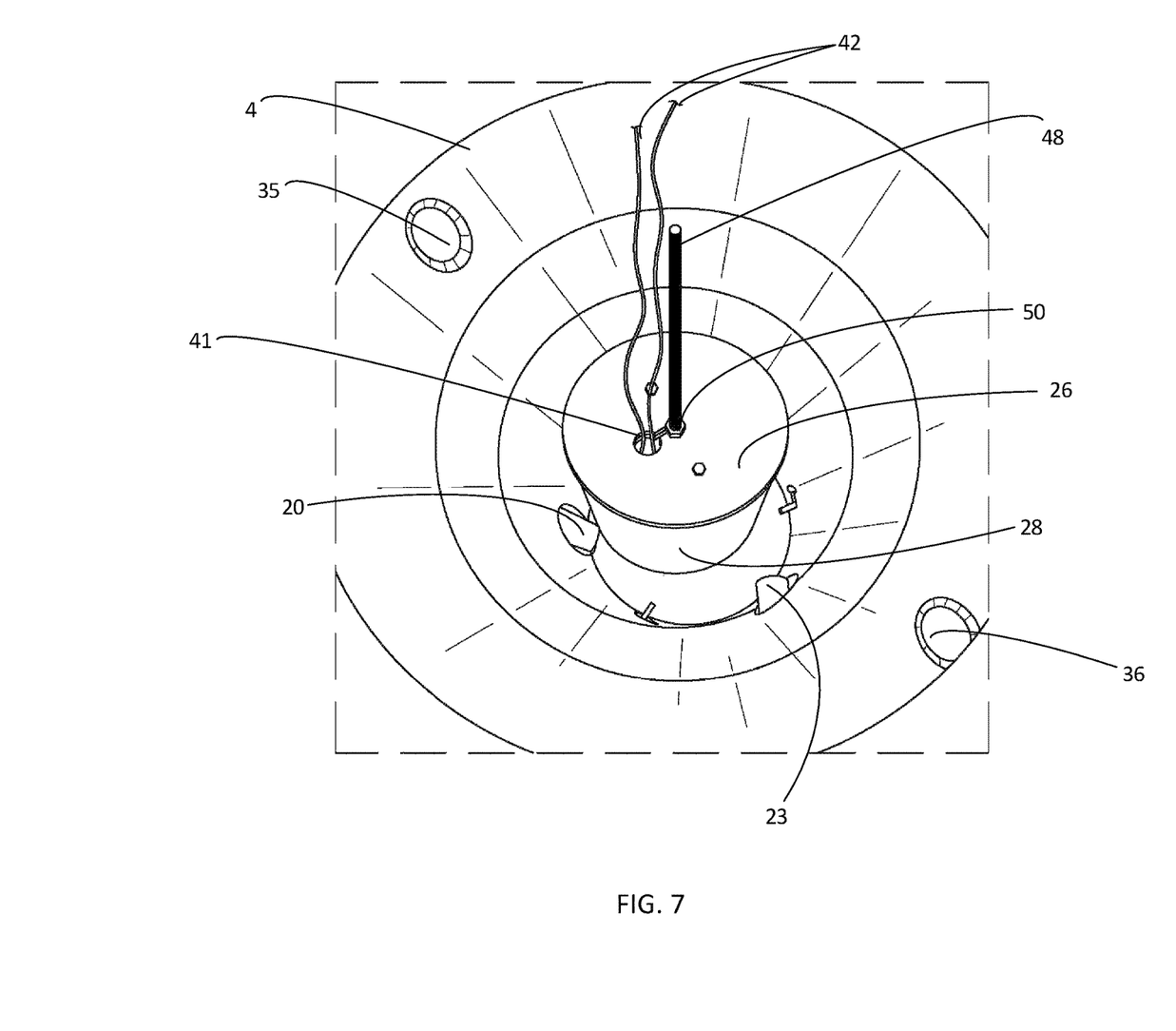
FIG. 7 is a perspective of the interior of the exemplary embodiment shown in FIG. 1.
Figure 8:
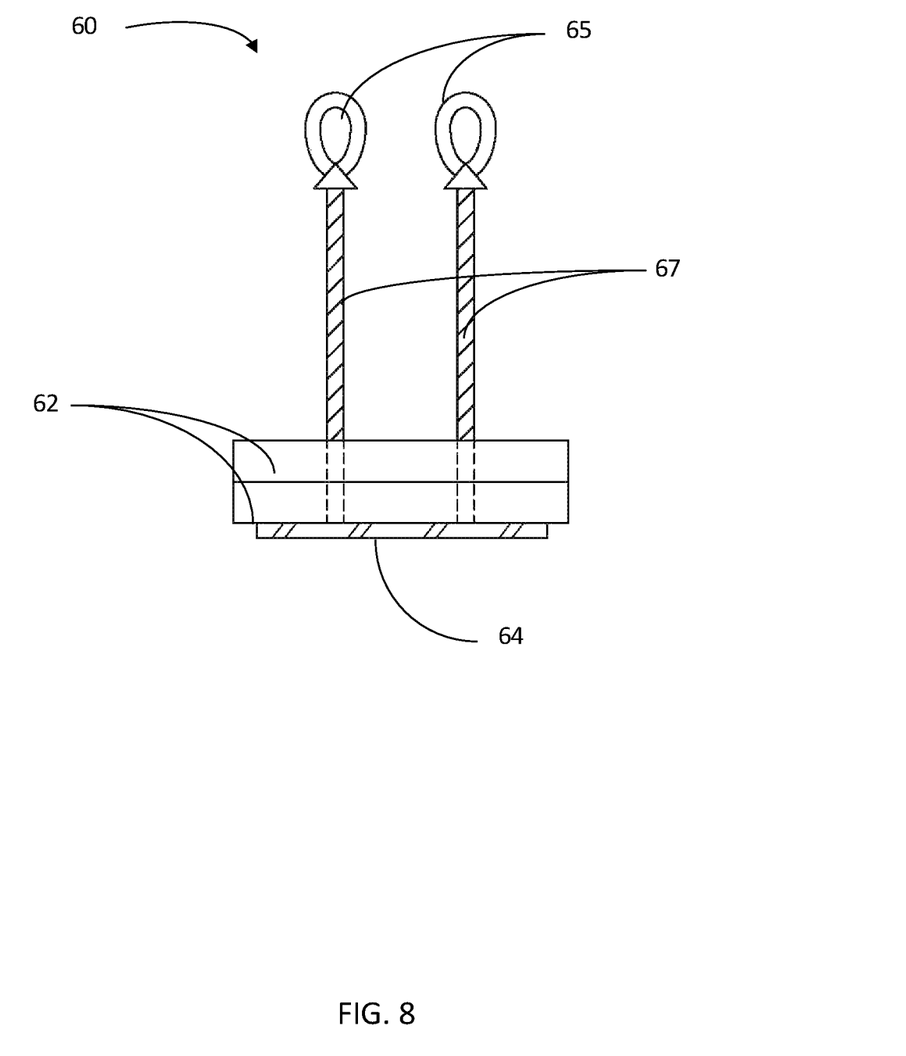
FIG. 8 is a side view of an exemplary specimen carrier in accordance with a further preferred embodiment of the present invention.

With reference now to FIG. 7, the specimen support pedestal 28 (shown in FIG. 5) and the internal arrangement of the enclosure 4 shall now be discussed. FIG. 7 illustrates the sensor ports 35, 36 and torches 20, 23 extending through the enclosure 4. As shown, the specimen support pedestal 28 includes the specimen support surface 26 which includes a keyhole opening 41 to allow the securing rod 48 and internal sensor wires 42 to extend therethrough to the interior raceway of the specimen. The specimen support surface 26 as shown is secured to the specimen support pedestal 28 via a securing nut 50 which is tightened onto the securing rod 48. The securing rod 48 may preferably be an all screw rod or the like.

Figure 9:
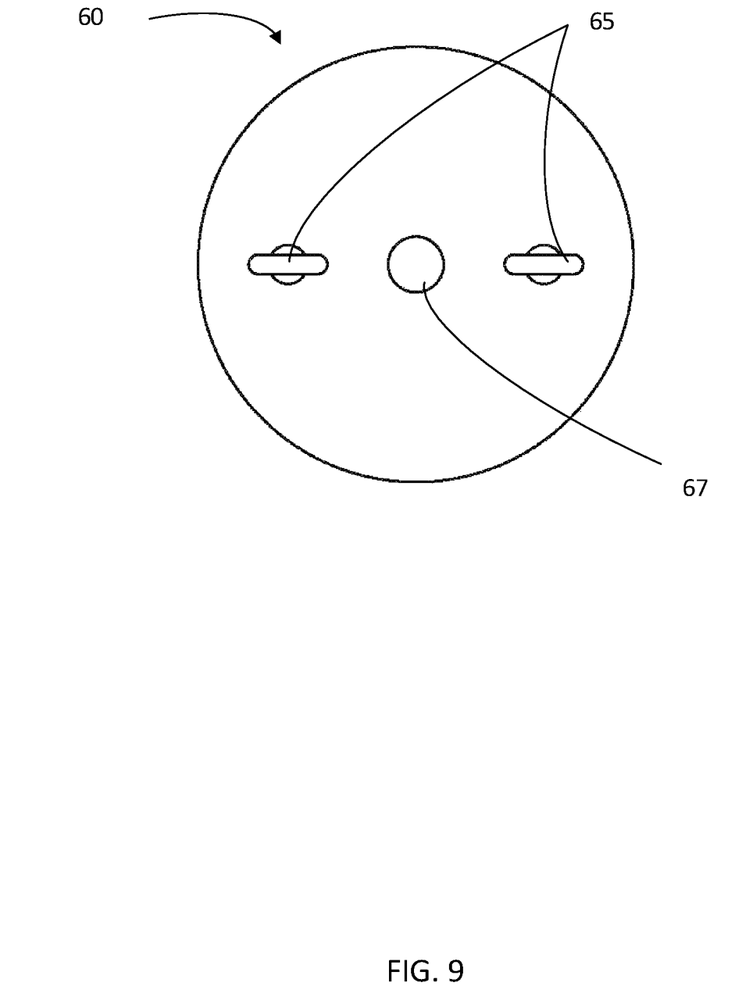
FIG. 9 is a top down view of the exemplary specimen carrier shown in FIG. 8.
Figure 10:
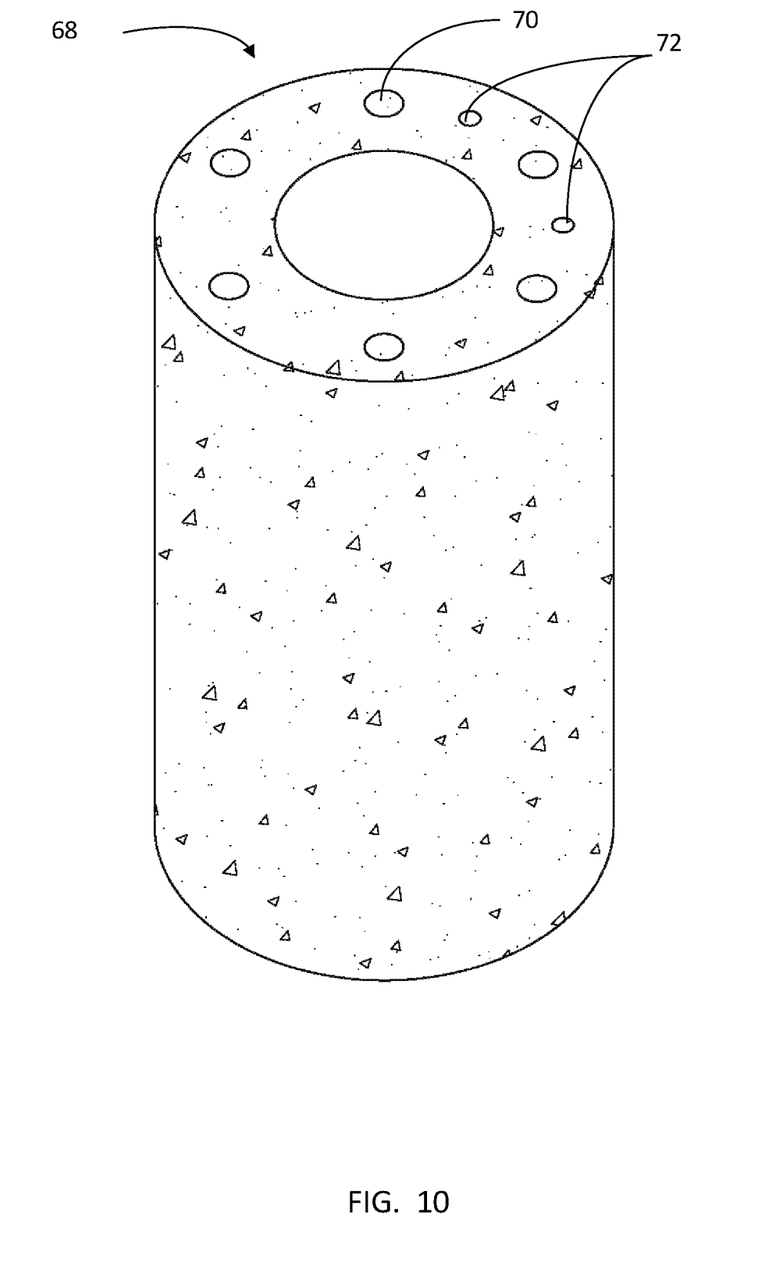
FIG. 10 is a perspective view of a spun concrete pole specimen prepared for use with the present invention.

With reference now to FIGS. 8-11, an exemplary specimen carrier 60 of the present invention shall now be discussed. The exemplary specimen carrier 60 preferably includes a carrier base 64 with one or more linear extension rods 67 extending from and attached thereto. As shown, the extension rods 67 preferably each include attached hoist rings 65 which preferably allow any carried specimen to be lifted and transported as needed. As shown in FIG. 9, the carrier base 64 (FIG. 8) preferably includes a carrier port 67 which preferably allows sensor wires 42 and the securing rod 48 (shown in FIG. 7) to extend through the carrier base 64 and into the center cavity of the specimen 68 (as shown in FIG. 10). According to a preferred embodiment, the specimen 68 and specimen carrier 60 may be transported, lifted, lowered to and from the specimen support surface 26 using a lifting winch, hoist or any other lifting mechanism (e.g., manual, hydraulic or motorized) without limitation.

As shown in FIG. 10, an exemplary specimen 68 may preferably be a cylindrical pole section having a hollow interior. The exemplary specimen 68 may preferably be formed of spun concrete and may have rebar 70 or other reinforcing materials within its structure such as prestressed steel strands. The exemplary specimen 68 may further include pre-drilled securing holes 72 to allow the insertion of thermocouples (shown in FIG. 2) to measure temperature within the wall of the specimen. An insulation layer 44 (as shown in FIG. 2) may preferably be inserted between the specimen top cap 46 and the specimen 68.

Figure 11:
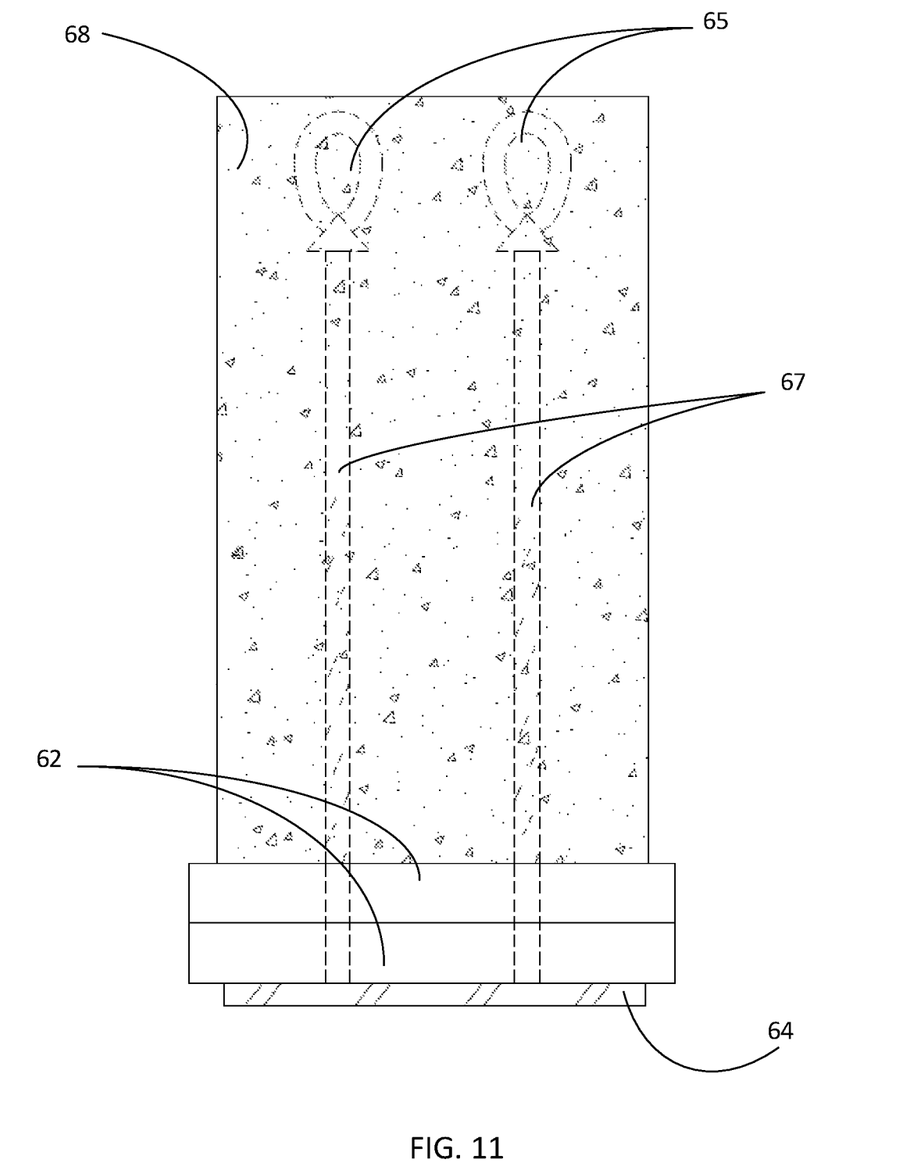
FIG. 11 is a side view of the exemplary specimen carrier shown in FIG. 8 with an exemplary concrete pole specimen attached.

With reference now to FIG. 11, the specimen 68 may preferably be loaded onto the carrier base 64 by inserting the specimen 68 over the hoist rings 65 so that the extension rods 67 extend through the specimen 68. According to a preferred embodiment, insulation layers 62 may preferably be provided between the specimen 68 and the carrier base 64.

Figure 12:
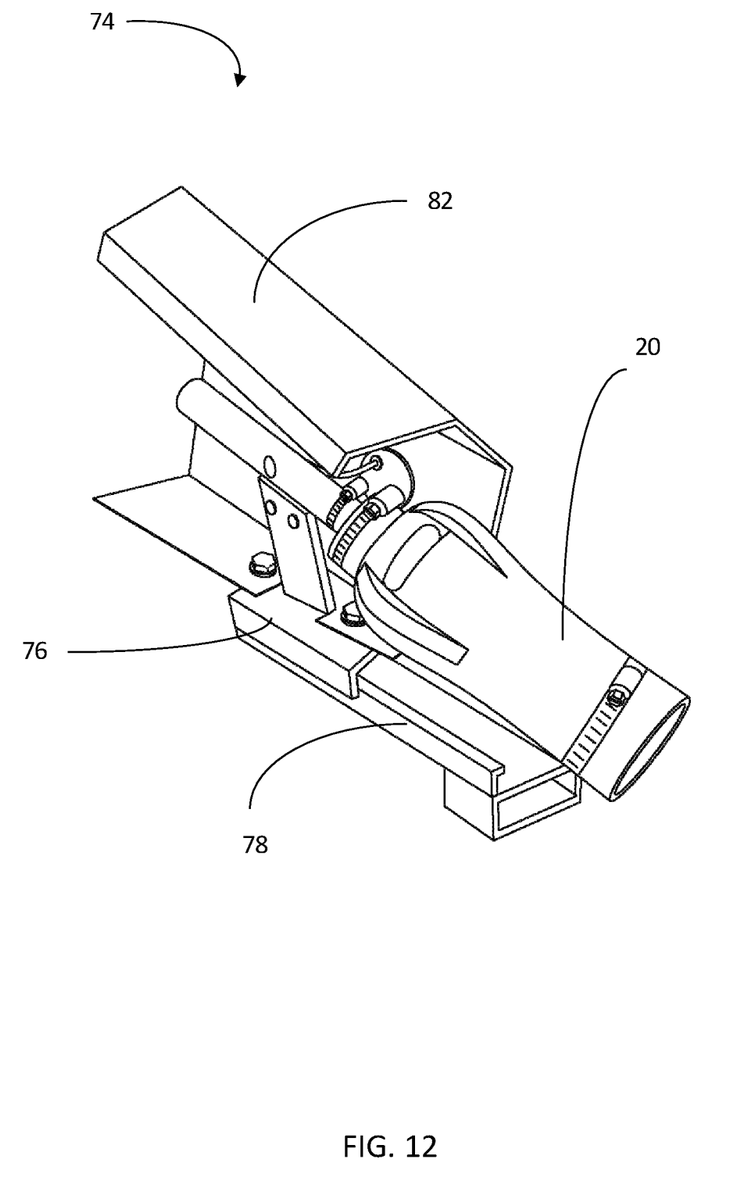
FIG. 12 is a perspective view of an exemplary torch assembly in accordance with the present invention

With reference now to FIG. 12, an exemplary torch assembly 74 for use with the present invention shall now be discussed. As shown, the exemplary torch assembly 74 may preferably include a torch 20 attached to a unistrut channel 76. Preferably, the unistrut channel 76 is designed and sized to slide onto and secure to a base plate bracket 78 which is preferably secured to the base plate 24 (not shown). The exemplary torch assembly 74 preferably may further include a heat shield 82, wrapped insulation and/or the like.

Figure 13:
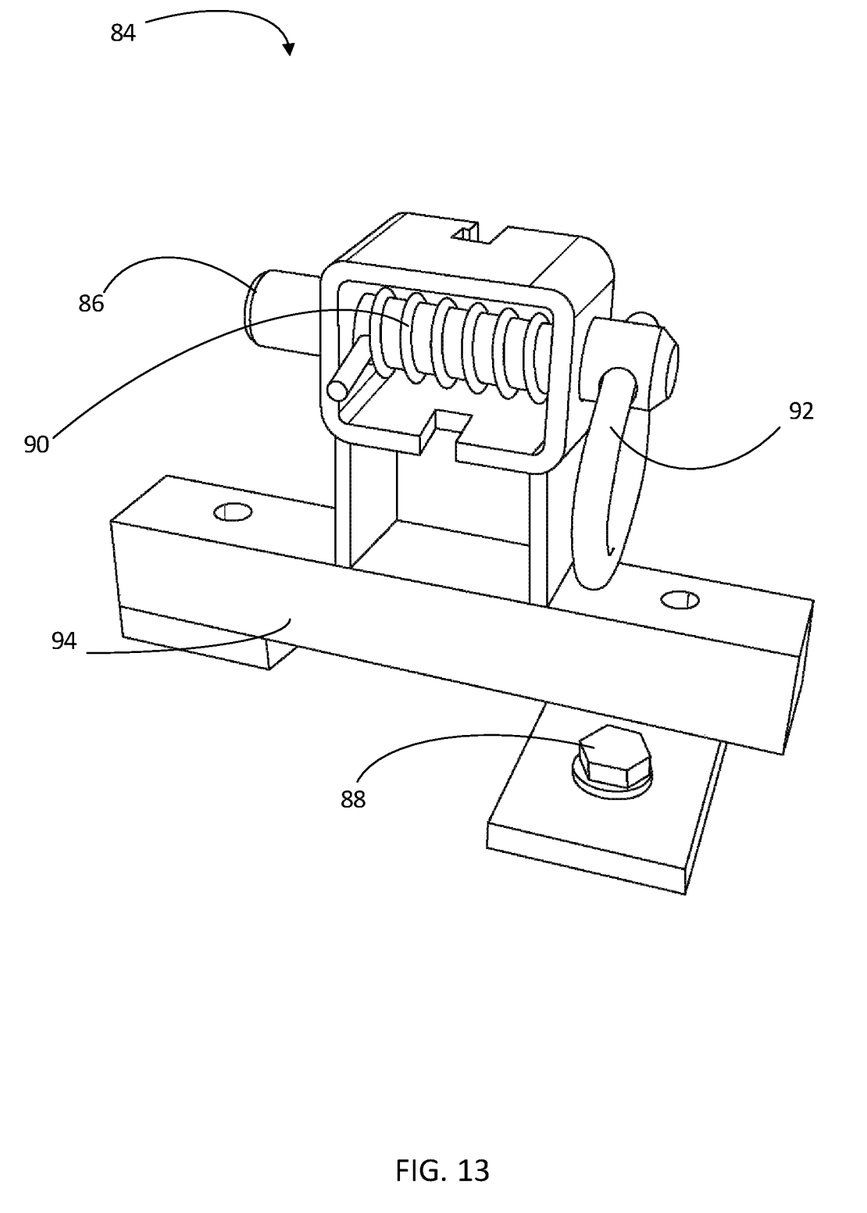
FIG. 13 is a perspective view of an exemplary pin lock in accordance with the present invention

With reference now to FIG. 13, an exemplary pin lock assembly 84 for use with the present invention shall now be discussed. As shown, the exemplary pin lock assembly 84 may preferably include a pin 86, a central spring 90 and a pull ring 92 which act together to allow the pin 86 to be manually retracted by the pull ring 92 and to be pushed forward by the central spring 90. As shown, the assembly 84 includes a pin base 94 and a pin mounting bolts 88 to allow the pin lock assembly 84 to be secured to the base plate 24 (not shown). As discussed above, when locked into place, the lower enclosure 12 of the present invention may preferably rest on the pin base 94 (or another structure) to create an air gap 15 between the base plate 24 and the enclosure wall 12 (as shown in FIG. 2).

Figure 14:
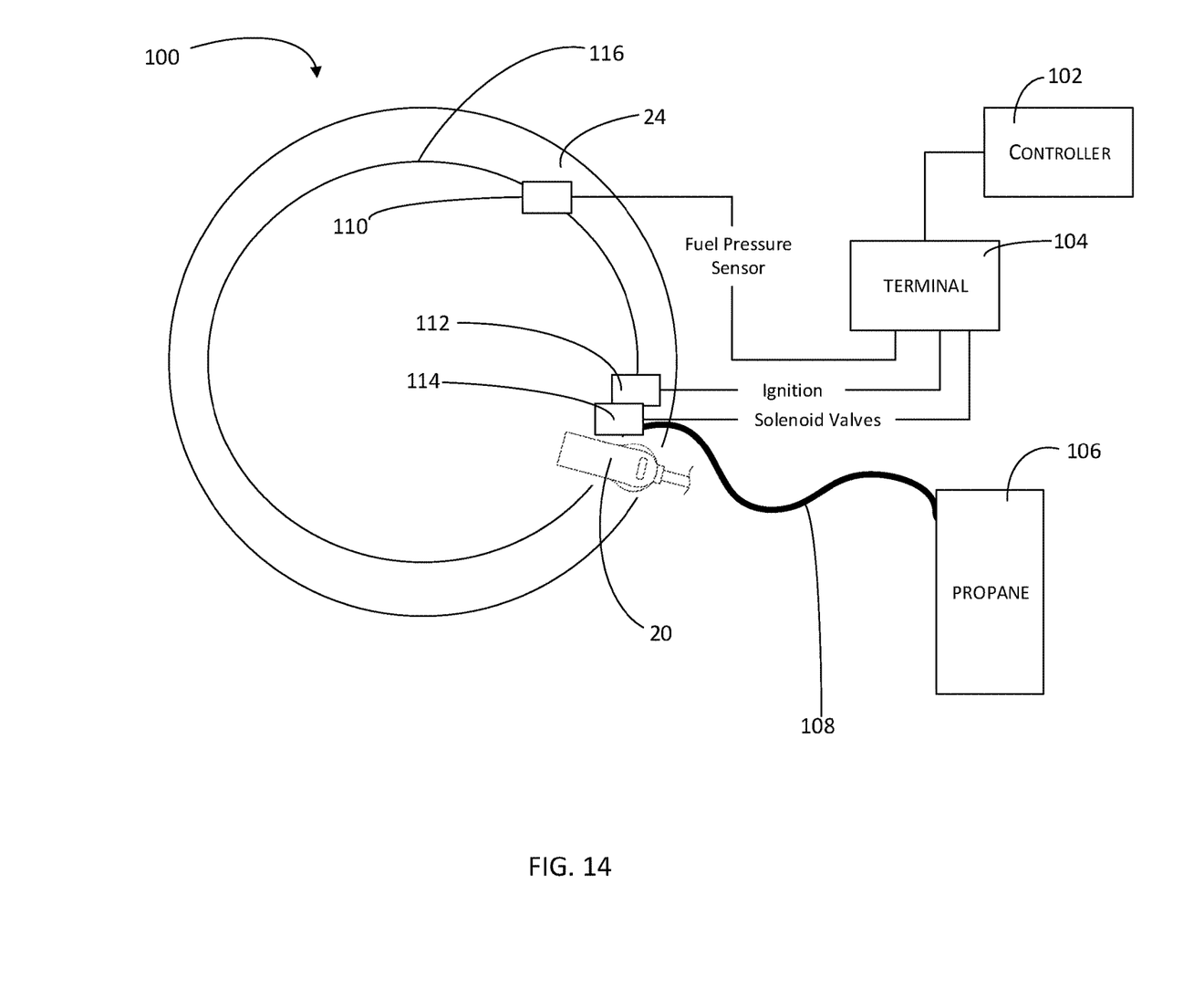
FIG. 14 is a diagram illustrating an exemplary fuel system in accordance with embodiments of the present invention.

With reference now to FIG. 14, an exemplary fuel system 100 for use with the present invention shall now be discussed. As shown, the fuel system 100 of the present invention preferably functions to provide controlled amounts of fuel to one or more torches 20 and thus provide selected levels of flame and heat to a given specimen. The flame tester 2 of the present invention preferably uses propane as a fuel source. According to alternative preferred embodiments, other fuel sources may also be used without limitation.

According to a preferred embodiment, the amount of fuel provided to each torch 20 is preferably controlled by a central controller 102. The controller 102 preferably may provide control signals to a terminal 104 which in turn may control the status of ignitors 112 and solenoid valves 114. The fuel is preferably provided by a fuel supply line 108 which transports fuel supplied under pressure by a fuel source such as a propane tank 106. Preferably, the present invention may include a fuel pressure sensor 110 which provides feedback to the controller 102. Additionally, a fuel manifold 116 may preferably be used to distribute fuel directly between torches 20.

Figure 15:
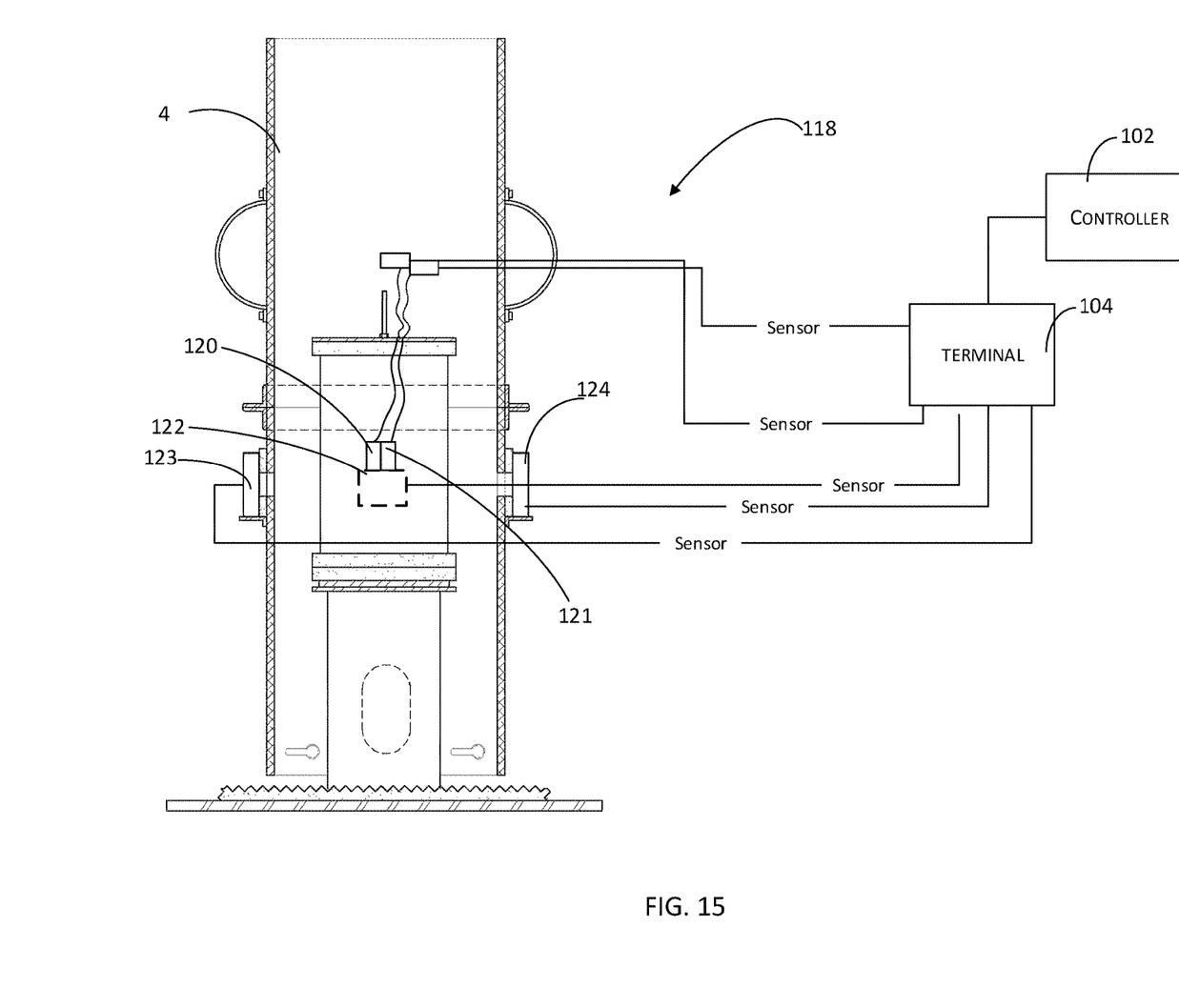
FIG. 15 is a diagram illustrating an exemplary sensor system in accordance with embodiments of the present invention.

With reference now to FIG. 15, an exemplary sensor system 118 for use with the present invention shall now be discussed. As with the fuel system 100 in FIG. 14 discussed above, the sensor system 118 is preferably controlled by the central controller 102 which receives sensor data from groups of sensors distributed within the enclosure 4. According to preferred embodiments, the sensors are preferably heat sensors in the form of transducers or the like which are positioned to detect and report temperatures in and around a tested specimen. According to preferred embodiments, sensors may be a combination of Type-K thermocouples and either aluminum or copper calorimeter heat flux sensors. As shown in FIG. 15, exemplary sensors may include a variety of temperature sensors which may preferably include: rebar sensors 120, specimen interior sensors 121, flame sensors 122, mid-wall heat flux sensors 123, 124. The sensor feedback is preferably provided from each installed sensor back to the controller 102 which preferably may record and analyze the received data. Preferably, sensor data may be collected using a multi-channel 24 bit logger and the controller may be a laptop computer or other processing device.

The present invention has been disclosed above with reference to several examples. These examples are not intended to be limiting. Instead, the scope of the present invention should be determined purely by the terms of the appended claims and their legal equivalents.

What is claimed is:

1. A system for testing and evaluating the flame resistance of pole samples, the system comprising:
    an enclosure, wherein the enclosure comprises an outer wall;
    wherein the outer wall comprises a plurality of torch ports;
    a plurality of torches, wherein the plurality of torches is configured to apply flame and heat to an enclosed specimen;
    a base plate;
    a specimen support pedestal, wherein the specimen support pedestal is attached to the base plate; wherein the specimen support pedestal comprises a specimen support surface for supporting a specimen;
    a fuel distribution system, wherein the fuel distribution system comprises a fuel source and a plurality of fuel lines configured to supply controlled amounts of fuel to the plurality of torches; wherein the fuel distribution system comprises a plurality of solenoid valves which are configured to control the amount of fuel supplied to the plurality of torches; wherein the fuel distribution system comprises an ignitor;
    a sensor system, wherein the sensor system comprises a plurality of sensors configured to detect temperature levels within the enclosure; and
    a system controller, wherein the system controller is configured to receive temperature data from the sensor system;

wherein the system controller is configured to send control signals to the ignitor and the plurality of solenoid valves to control heat and flame levels within the enclosure;

wherein the enclosure comprises an upper enclosure and a lower enclosure; wherein the upper enclosure is detachable from the lower enclosure;

wherein the upper enclosure comprises an upper bolting flange and the lower enclosure comprises a lower bolting flange;

wherein the upper bolting flange and the lower bolting flange are configured to be secured together using a plurality of securing bolts;

wherein the base plate comprises a plurality of enclosure supports; wherein the enclosure is positioned to sit on top of the plurality of enclosure supports to maintain an air gap between the enclosure and the base plate.

2. The system of claim 1, wherein the enclosure is formed of spiral sheet metal duct material.

3. The system of claim 1, wherein the system further comprises an insulation mat; wherein the base plate is insulated from the enclosure by the insulation mat.

4. The system of claim 3, wherein the insulation mat comprises ceramic insulation.

5. The system of claim 4, wherein the insulation mat is formed of material selected from the group of materials comprising: chopped fibers, foam, fibrous mats, textiles, board insulation, block insulation, films and foils.

6. The system of claim 1, wherein the system further comprises a plurality of legs; wherein the plurality of legs are secured to a lower surface of the base plate.

7. The system of claim 1, wherein the specimen support pedestal comprises a specimen support surface.

8. The system of claim 1, wherein the enclosure comprises at least one sensor port and at least one sensor frame; wherein the system comprises at least one heat sensor; wherein the heat sensor is attached to the sensor frame; wherein the heat sensor extends through the sensor port into the enclosure.

9. The system of claim 8, wherein the system comprises a spring lock; wherein the spring lock is fixedly attached to the base plate; wherein at least a portion of the spring lock is configured to retract to a first position and to extend through the enclosure in a second position.

10. The system of claim 9, wherein the specimen support pedestal comprises a keyhole opening; wherein the system comprises a securing rod and a sensor wire; wherein the securing rod and the sensor wire extend through the specimen support pedestal.

11. The system of claim 10, wherein the specimen support surface is secured to the specimen support pedestal via a securing bolt which is attached to the securing rod.

12. The system of claim 11, wherein the securing rod comprises a screw rod.

13. The system of claim 10, wherein the system comprises a specimen carrier.

14. The system of claim 13, wherein the specimen carrier comprises a carrier base and a linear extension rod; wherein the linear extension rod extends vertically up from the carrier base.

15. The system of claim 14, wherein the linear extension rod comprises a hoist ring.

16. The system of claim 15, wherein the carrier base comprises a carrier port; wherein the carrier port is positioned to allow the sensor wire and the securing rod to extend through the carrier port.

17. The system of claim 16, wherein the specimen carrier is configured to support a specimen; wherein the linear extension rod is positioned to extend through a hollow specimen supported on the specimen carrier.

18. The system of claim 17, wherein the hollow specimen comprises a cylindrical pole section having a hollow interior.

19. The system of claim 18, wherein the system comprises a torch assembly; wherein the torch assembly comprises a unistrut channel, a base plate bracket, and a heat shield; wherein the unistrut channel is configured to support and secure one of the plurality of torches.

* * * * *